United States Patent [19]

Nakanowatari

[11] Patent Number: 4,842,377
[45] Date of Patent: Jun. 27, 1989

[54] LIQUID CRYSTAL DEVICE HAVING "DUMMY" THIN-FILM TRANSISTORS AS SPACERS

[75] Inventor: Jun Nakanowatari, Miyagi, Japan

[73] Assignee: Alps Electric Co., Ltd., Japan

[21] Appl. No.: 180,299

[22] Filed: Apr. 12, 1988

[30] Foreign Application Priority Data

Jul. 25, 1987 [JP] Japan ................. 62-186134

[51] Int. Cl.⁴ .............................................. G02F 1/13
[52] U.S. Cl. .................... 350/344; 350/334; 350/350 S
[58] Field of Search ............... 350/334, 344, 350 S

[56] References Cited

U.S. PATENT DOCUMENTS 4,448,491 5/1984 Okubo ................. 350/344
4,561,726 12/1985 Goodby et al. ................. 350/341

Primary Examiner—Stanley D. Miller
Assistant Examiner—Richard F. Gallivan
Attorney, Agent, or Firm—Guy W. Shoup; Paul J. Winters; Stephen L. Malaska

[57] ABSTRACT

A liquid crystal device includes a pair of first and second opposed substrates, a ferroelectric liquid crystal filled in a space defined between both the substrates, and a thin film transistor formed on at least one of the substrates. The thin film transistor is used as a spacer between the substrates, and the spacer is bonded to the first substrate opposed to the second substrate on which the spacer is formed. In another aspect, a dummy corresponding to the thin film transistor is further provided on the substrate on which the thin film transistor is formed, wherein the dummy is used as a spacer.

1 Claim, 1 Drawing Sheet

LIQUID CRYSTAL DEVICE HAVING "DUMMY" THIN-FILM TRANSISTORS AS SPACERS

BACKGROUND OF THE INVENTION

The present invention relates to a liquid crystal device employing a ferroelectric liquid crystal and a thin film transistor as a switching device.

A liquid crystal device employing a ferroelectric liquid crystal exhibiting a chiral smectic-C phase is being applied to a memory type display, a high-speed shutter, etc. owing to the fact that the ferroelectric liquid crystal has a bistable state, a display memory property and a high-speed response property. Particularly, the liquid crystal device is considered to be suitable for a large-capacity display having a matrix pixel structure and requiring a large-area display.

In the above-mentioned liquid crystal device of a ferroelectric liquid crystal type, an orientation defect due to the discrepancy in surfaces of layers is easily generated as compared with a TN type liquid crystal device which is usually employed. Once such an orientation defect is generated, it is hard to restore an orientation to an original state. While the orientation defect is caused by the presence of a foriegn matter on the surface of an oriented film and the nonuniformity in an orientation process, it is primarily caused by the deformation of a liquid crystal cell in receipt of an external force, which causes a change in cell gap to generate flow of a liquid crystal in the cell. This defect causes an adverse affect on display characteristics such as a reduction in display contrast and a change in threshold voltage.

Further, the liquid crystal device of the ferroelectric liquid crystal type conducts displaying by utilizing a double refraction effect of a liquid crystal molecule. Accordingly, it is necessary to make uniform a gap between substrates (which will be hereinafter referred to as a cell gap), and it is further necessary to set the cell gap to a small value of about 2 $\mu$m. As a method of forming a small cell gap of about 2 $\mu$m, the following method may be considered for example. That is, inorganic particles such as aluminum oxide and silicon dioxide each having a diameter of about 2 $\mu$m are dispersed as a spacer between both the substrate, and granular adhesives such as epoxy resin each having a particle size of about 5-10 $\mu$m are dispersed. Then, both the substrates are heated to melt the granular adhesives and thereby bond the substrates to each other. In this case, the inorganic particles serve as a spacer to suppress a partial change in the cell gap and thereby make the cell gap uniform.

However, in the liquid crystal device obtained by this method, if the granular adhesives are irregularly dispersed, a plurality of the adhesives are gathered to be united in bonding both the substrates, and in some cases, the adhesives are crushed to become several tens $\mu$m in size after bonding both the substrates. As a result, a uniform cell gap cannot be obtained, causing a reduction in display quality. Further, in the event that the granular adhesives are hardened in an aperture, there is no problem in display to be visually observed, but there is a possibility that a display contrast is reduced in a shutter array or the like having a small aperture for a printer. Moreover, in the event that the inorganic particles employed as a spacer are sandwiched between the substrate and a thin film transistor, there is a possibility that the inorganic particles are forced into the thin film transistor to break the same.

SUMMARY OF THE INVENTION

Accordingly, it is an object of the present invention to provide a liquid crystal device which may ensure a uniform small thickness of the cell gap and thereby obtain improved display characteristics.

It is another object of the present invention to provide a liquid crystal device which may suppress a change in the cell gap even when an undue external force is applied to the liquid crystal cell and thereby prevent a reduction in display contrast and a change in threshold voltage.

According to one aspect of the present invention, there is provided in a liquid crystal device having a pair of first and second opposed substrates, a ferroelectric liquid crystal filled in a space defined between the substrates, and a thin film transistor formed on at least one of the substrates; the improvement wherein the thin film transistor is used as a spacer between the substrates, and the spacer is bonded to the first substrate opposed to the second substrate on which the spacer is formed.

According to another aspect of the present invention, there is provided in a liquid crystal device having a pair of first and second opposed substrates, a ferroelectric liquid crystal filled in a space defined between the substrates, and a thin film transistor formed on at least one of the substrates; the improvement comprising a dummy corresponding to the thin film transistor is formed on the substrate on which the thin film transistor is formed, wherein the dummy is used as a spacer between the substrates, and the spacer is bonded to the first substrate opposed to the second substrate on which the spacer is formed.

Other objects and features of the invention will be more fully understood from the following detailed description and appended claims when taken with the accompanying drawings.

DETAILED DESCRIPTION OF THE PREFERRED EMBODIMENTS

There will now be described a preferred embodiment of the liquid crystal device according to the present invention by way of a producing method thereof. The liquid crystal device in this embodiment is constituted of a plurality of pixel forming elements arranged like a matrix, each element being formed by a set of a pixel electrode and a thin film transistor, which liquid crystal device is applied to a large-capacity display.

Figure 1:
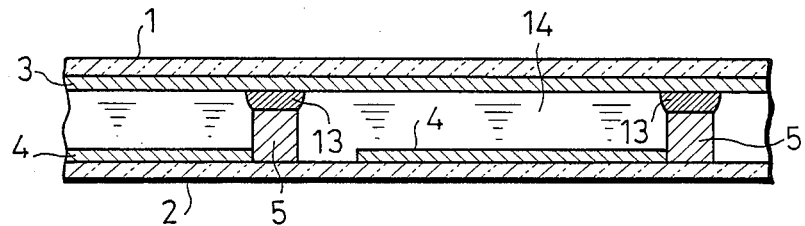
FIG. 1 is a schematic illustration in section of a preferred embodiment of the liquid crystal device according to the present invention.

Referring to FIG. 1, a transparent electrode 3 such as ITO is formed on the inner surface of a glass substrate 1, and pixel electrodes 4 are formed on the inner surface of a glass substrate 2 by an ordinary method. The pixel electrodes 4 are arranged like a matrix.

Figure 2:
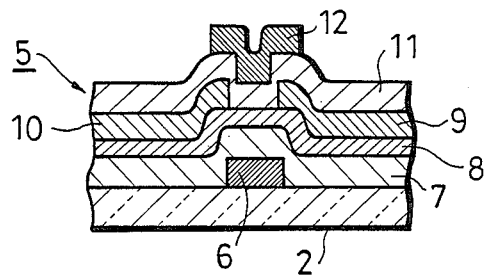
FIG. 2 is a schematic illustration in section of a thin film transistor shown in FIG. 1.

Then, thin film transistors 5 are formed on the inner surface of the glass substrate 2 in correspondence with the pixel electrodes 4. Each of the thin film transistors 5 has a known construction. As shown in FIG. 2, the thin film transistor 5 comprises a gate electrode 6 formed on the glass substrate 2, a first insulating film 7 formed on the glass substrate 2, covering the gate electrode 6, a semiconductor film 8 formed on the first insulating film 7, a source electrode 9 and a drain electrode 10 both formed on the semiconductor film 8, a second insulating film 11 so formed as to cover the source electrode 9 and the drain electrode 10, and a light shield 12 formed on the first insulating film 11 at a position just over the gate electrode 6.

The thin film transistor 5 is prepared in the following manner. First, the gate electrode 6 such as molybdenum or chromium is formed, and then the first insulating film 7 such as silicon nitride (SiNx) is formed on the glass substrate 2 in such a manner as to cover the gate electrode 6. Then, the semiconductor film 8 such as amorphous silicon hydride is formed on the first insulating film 7, and then the source electrode 9 and the drain electrode 10 are formed on the semiconductor film 8. Thereafter, the second insulating film 11 such as silicon nitride is so formed as to cover the source electrode 9 and the drain electrode 10. Then, the light shield 12 is formed on the second insulating film 11 at a position just over the gate electrode 6. Thus, the thin film transistor 5 is obtained. These elements constituting the thin film transistor 5 are formed to have an accurate thickness, shape, etc., and therefore each of the thin film transistors 5 formed by superimposing these elements has a uniform thickness. In each thin film transistor 5, the thickness of the first insulating film 7 is set to about 330 nm, and the thickness of the semiconductor film 8 is set to about 250 nm, and the thickness of the source electrode 9 and the drain electrode 10 is set to about 560 nm, and the thickness of the second insulating film 11 is set to about 550 nm, for example. By setting the thickness of these elements to the above values, the whole thickness of the thin film transistor 5 is set to a predetermined value of about 2 μm.

Figure 3:
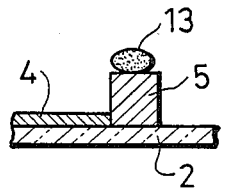
FIG. 3 is a sectional view of an essential part in FIG. 1, showing a producing step of the liquid crystal device.

Then, as shown in FIG. 3, an adhesive 13 is applied on each thin film transistor 5, and a sealing material (not shown) such as an opoxy resin adhesive is applied at the periphery of the glass substrate 1 on the inner surface on which the transparent electrode 3 is formed. Examples of the adhesive 13 may include "Locktite 350" (produced by Locktite Japan Corporation) and "XN-5A" (produced by Mitsui Toatsu Co., Ltd.).

Then, the transparent electrode 3 formed on the glass substrate 1 is opposed to the glass substrate 2, and the glass substrate 1 is put on the adhesives 13 applied on the thin film transistors 5 as shown in FIG. 1. At this time, the thin film transistors 5 serve as a spacer. Then, the adhesives 13 and the sealing material are cured to bond the glass substrate 1 to the thin film transistors 5 and bond the glass substrate 1 to the glass substrate 2, thus obtaining a cell. In this case, the cell gap (which is precisely equal to a value obtained by subtracting the thickness of the transparent electrodes 3 and the pixel electrodes 4 from the gap between both the glass substrates) is set to a fixed value defined by the thickness of the thin film transistor 5 and the thickness of the adhesive 13 after cured.

Thereafter, a ferroelectric liquid crystal exhibiting a chiral smectic-C phase is filled into the cell defined between the glass substrate 1 and 2 to form a liquid crystal portion 14. The, a polorizing plate (not shown) is mounted to the cell to obtain a liquid crystal device. Examples of the ferroelectric liquid crystal may include MBR-8, MORO-8 or CS-1014 (produced by Chisso Coporation).

In the liquid crystal device as obtained above, as the thin film transistors 5 located in correspondence with the pixel electrodes 4 are utilized as a spacer, and the thickness of each thin film transistor 5 is made accurate, the cell gap may be made uniform over the entire area of the liquid crystal device. Further, as the spacers formed by the thin film transistors 5 are bonded by the adhesives 13 to the glass substrate 1, a change in the cell gap between both the substrates may be suppressed even when an undue external force is applied to the liquid crystal cell, thereby preventing a reduction in display contrast and a change in threshold voltage due to the change in the cell gap. Further, as no inorganic particles are used as the spacer, there is no possibility that the inorganic particles are sandwiched between the glass substrate 1 and the thin film transistors 5 to break the thin film transistors 5.

Although the adhesive to be applied on the thin film transistors 5 in this embodiment is of a UV setting type and a thermosetting type, the adhesive employable in this invention is not limited to the above types, but various types with respect to shape, condition (liquid or powder) and setting type may be used.

There will now be described another preferred embodiment of the liquid crystal device according to the present invention. The liquid crystal device shown in FIG. 4 differs from that shown in FIG. 1 in a point that dummies 15 are formed in correspondence with the thin film transistors 5, and the dummies 15 are utilized as a spacer.

Figure 4:
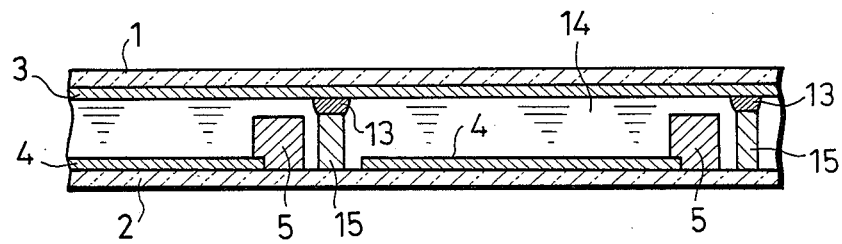
FIG. 4 is a schematic illustration in section of another preferred embodiment of the liquid crystal device according to the present invention.

In the liquid crystal device shown in FIG. 4, thin film transistors 5 as a switching device are located on the inner surface of the glass substrate 2 at a side position of the pixel electrodes 4, and the dummies 15 as a spacer are formed in the vicinity of the thin film transistors 5 between both the glass substrates 1 and 2. The dummies 15 are formed in correspondence with the pixel electrodes 4 and the thin film transistors 5. Each of the dummies 15 is constituted to a pseudo pixel electrode corresponding to the gate electrode 4, a pseudo gate electrode corresponding to the gate electrode 6 of the thin film transistor 5, a pseudo first insulating film corresponding to the first insulating film 7, a pseudo semiconductor film corresponding to the semiconductor film 8, a pseudo source electrode and a pseudo drain electrode corresponding to the source electrode 9 and the drain electrode 10, a pseudo second insulating film corresponding to the second insulating film 11 and a pseudo light shield corresponding to the light shield 12. These pseudo elements are not shown, but they are superimposed in the above-mentioned order. The dummies 15 are formed on the glass substrate 2 in isolated relationship to each other, so as not to be short-circuited with the pixel electrodes 4 and the thin film transistors 5. The pseudo pixel electrode of the dummy has a thickness identical with that of the pixel electrode 4, and each of the other elements of the dummy 15 has a thickness identical with that of each respective element of the thin film transistor 5. Accordingly, a thickness of the dummy 15 is equal to the sum of the thickness of the thin film transistor 5 and the thickness of the pseudo pixel electrode.

The adhesive 13 is applied on each dummy 15, and is cured to bond the dummy 15 to the glass substrate 1.

In this manner, the dummies 15 are located as a spacer between the glass substrates 1 and 2 (Precisely, between the transparent electrode 3 and the glass substrate 2), and the cell gap is set to a fixed value determined by the thickness of the dummy 15 and the thickness of the adhesive 13 after cured.

Although each dummy 15 is located in the vicinity of each thin film transistor 5 in this embodiment, it may be located at an arbitrary position, and a suitable number of the dummies 15 may be formed.

In the liquid crystal device as obtained above, as the plural dummies 15 formed in correspondence with the thin film transistors 5 are used as a spacer, and the thickness of each dummy is made accurate, the cell gap may be made uniform over the entire area of the liquid crystal device. Further, as the thickness of each dummy 15 is slightly greater than that of each thin film transistor 5 (by the amount corresponding to the sum of the thickness of the pseudo pixel electrode and the thickness of the adhesive 13 after cured), it is possible to prevent the thin film transistors' 5 being depressed by the glass substrate 1 and being broken thereby. Further, similar to the previous preferred embodiment, the spacers formed by the dummies 15 are bonded by the adhesives 13 to the glass substrate 1, a change in the cell gap between both the substrates may be suppressed even when an undue external force is applied to the liquid crystal cell, thereby preventing a reduction in display contrast and a change in threshold voltage due to the change in the cell gap. Further, as no inorganic particles are used as the spacer, there is no possibility that the inorganic particles are sandwiched between the glass substrate 1 and the thin film transistors 5 to break the thin film transistors 5.

EXAMPLE

An example of the liquid crystal device according to the present invention was prepared by the following method.

First, a transparent electrode and pixel electrodes were formed on the opposed surfaces of two glass substrates, and then a-Si thin film transistors were formed in correspondence with the pixel electrodes on the glass substrate, thus forming an electrode pattern.

Then, a UV setting resin "Loctite 350" (produced by Loctite Japan Corporation) as a sealing material was applied with a thickness of about 4 $\mu$m to the periphery of the glass substrate on which the thin film transistor is not formed by means of a relief offset printing machine, while the adhesive "Loctite 350" was applied with a thickness of about 1 $\mu$m to the thin film transistor on the glass substrate by means of an intaglio offset printing machine.

Then, the glass substrate on which the transparent electrode was formed was put on the resin formed on the thin film transistor, and an ultraviolet radiation was irradiated on the resin by using a UV irradiating device to cure the resin, thereby bonding the thin film transistor to the glass substrate and also bonding both the glass substrates by the sealing material. Thus, a cell was obtained.

The gap between both the substrates of the cell obtained was measured by a Michelson interferometer "MI-$\mu$S" (produced by Mizojiri Optical Co., Ltd.), and as the result, the gap was 2.2 $\mu$m.

Thereafter, a ferroelectric liquid crystal "CS-1014" (produced by Chisso Corporation) was filled into the cell to obtain a liquid crystal cell. After a filler port was closed, the liquid crystal cell was gradually cooled from an isotropic liquid phase to obtain a uniform orientation in the liquid crystal cell.

Then, a polarizing plate or the like was mounted to the liquid crystal cell to obtain a liquid crystal device. The characteristics of the liquid crystal device was investigated, and as the result, it was found that a strength of the cell is increased more than a conventional liquid crystal device, and that the orientation defect due to deformation of the cell is less generated.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a liquid crystal device having a pair of first and second opposed substrates, a ferroelectric liquid crystal filled in a space defined between said substrates, and a thin film transistor formed on at least one of said substrates; the improvement comprising a dummy corresponding to said thin film transistor being formed on said substrate on which said thin film transistor is formed comprising a pseudo pixel electrode electrically insulated from said thin film transistor, and a pseudo thin film transistor; a thickness of said dummy is equal to the sum of a thickness of said thin film transistor and thickness of said pseudo pixel electrode, wherein said dummy is used as a spacer between said substrates, and said dummy is bonded to said first substrate opposed to said second substrate on which said dummy is formed.

* * * * *